United States Patent [19]

McKelvey

[11] Patent Number: 5,896,499

[45] Date of Patent: Apr. 20, 1999

[54] EMBEDDED SECURITY PROCESSOR

[75] Inventor: Mark Ambrose McKelvey, Rochester, Minn.

[73] Assignee: International Business Machines Corporation, Armonk, N.Y.

[21] Appl. No.: 08/803,661

[22] Filed: Feb. 21, 1997

[51] Int. Cl.[6] .................................................. G06F 11/00
[52] U.S. Cl. ........................................................ 395/187.01
[58] Field of Search ............................ 395/186, 187.01, 395/188.01, 200.55, 200.56, 200.59; 380/3, 9, 23, 25; 707/9

[56] References Cited

U.S. PATENT DOCUMENTS

| | | | |
|---|---|---|---|
| 4,371,929 | 2/1983 | Brann et al. | 364/200 |
| 4,713,753 | 12/1987 | Boebert et al. | 364/200 |
| 5,126,728 | 6/1992 | Hall | 395/187.01 |
| 5,416,842 | 5/1995 | Aziz | 380/30 |
| 5,499,297 | 3/1996 | Boebert | 380/23 |
| 5,524,206 | 6/1996 | Saito | 395/182.21 |
| 5,550,984 | 8/1996 | Gelb | 395/200.17 |
| 5,553,072 | 9/1996 | Daggett et al. | 370/85.3 |
| 5,577,209 | 11/1996 | Boyle et al. | 395/187.01 |
| 5,623,600 | 4/1997 | Ji et al. | 395/187.01 |
| 5,623,601 | 4/1997 | Vu | 385/187.01 |
| 5,630,057 | 5/1997 | Hait | 395/186 |
| 5,666,516 | 9/1997 | Combs | 395/186 |
| 5,673,322 | 9/1997 | Pepe et al. | 380/49 |
| 5,682,518 | 10/1997 | Inoue | 395/182.09 |
| 5,692,124 | 11/1997 | Holden et al. | 395/186 |
| 5,696,895 | 12/1997 | Hemphill et al. | 395/182.02 |
| 5,734,820 | 3/1998 | Howard et al. | 395/187.01 |

OTHER PUBLICATIONS

Smith, "A Secure Email Gateway (Building an RCAS External Interface)", Computer Security Applications Conf. IEEE, pp. 202-211, 1994.

Tirenin et alo., "Enhanced Multinet Gateway: Survivable Multi Level Secure Data Communications", Milcom, IEEE, pp. 740-744, 1991.

*Primary Examiner*—Joseph E. Palys
*Attorney, Agent, or Firm*—Schmeiser, Olsen & Watts

[57] ABSTRACT

An embedded security processor is used in conjunction with a main processor to provide security for a computer system that is accessible via a computer network. In a preferred embodiment of the present invention, an expansion board is provided that has an embedded security processor dedicated to network communications security tasks. The embedded security processor is controlled by the main processor and intercepts all communications from external untrusted or unverified network systems (i.e., unsecure networks) and verifies that the attempted communication is permissible before allowing the external network communication traffic to access the main processor, or other networked computer resources accessible via a secure network.

38 Claims, 3 Drawing Sheets

EMBEDDED SECURITY PROCESSOR

BACKGROUND OF THE INVENTION

1. Technical Field

This invention generally relates to computer security, and more specifically relates to a computer security system for computers connected to an Intranet, the Internet, the worldwide web, or other computer networks.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful that just a few years ago.

Other changes in technology have also profoundly affected how we use computers. For example, the widespread proliferation of computers has prompted the development of computer networks that allow computers to communicate quickly and efficiently with each other. With the introduction of the personal computer (PC), computing became accessible to large numbers of people. Networks for personal computers were developed to allow individual users to communicate with each other. In this manner, a large number of people within a company or other organization could communicate at the same time with a software application running on one computer system.

One significant computer network that has become very popular is the Internet. The Internet grew out of the modern proliferation of computers and networks and has currently evolved into a sophisticated worldwide network of computer systems linked together. The Internet is considered an "unsecure" network because anyone with the necessary computer equipment has access to the information that is transmitted on the Internet. If an individual wishes to protect their transmitted information from being received or intercepted by unauthorized individuals, then additional software or hardware must be provided.

In addition to the Internet and other types of public networks, private computer networks presently exist in many different forms and serve many purposes. For example, there are credit card computer networks which direct network traffic to banks for authorizations and transaction posting, there are university computer networks which maintain student or scientific research information, and there are many private company computer networks which contain a variety of proprietary information.

Another recent development in the area of computer networks is the proliferation of "Intranets." Intranets are typically networks of computer workstations, and/or computer resources or systems that belong to a single company, division, or branch of a company. Intranets are considered "secure" networks because they are typically connected to an outside or external network via a security system that restricts access to only authorized users. Intranets are considered to be more secure than other types of public computer networks because they can be isolated from other, outside networks. The rapid expansion of computer networks and the technological advances in communication equipment promises to bring even more connectivity to computer networks through such mechanisms as cable modems, computerized home televisions, and direct access multimedia services.

Along with the explosive growth experienced by computer networks in the past few years, an ever increasing concern is the need to provide enhanced security protection for networked computer systems and resources. In particular, where private computer resources (i.e., software applications, data files, World Wide Web pages, etc.) are accessed using standard Internet communication tools, security must be provided to protect the private resources from unauthorized access. This involves ensuring that access to networked resources is granted only to approved users, whether the users are within a company or external to the company. For example, many companies have remote offices or branches located in various parts of the country. Each office or branch may operate and maintain a computer network and each of these local computer networks may be interconnected in a company-wide computer network or tied together via the Internet. It is often desirable in this type of computer network environment to prevent unauthorized access to one of the local computer networks from another of the local computer networks and also to restrict access by unauthorized Internet users.

This network communication technique is often used on private computer networks as well. Private computer networks are often linked to other private computer networks, such as in a company where multiple user groups exist in the organization with corresponding multiple computer networks. The risk of break-ins and computer misuse in one private network by users of another private network is also present. For example, a disgruntled employee working from a local area network (LAN) in one organization of the company may break into the private computer network of another organization with the company and cause files to be altered or erased. Alternatively, someone may introduce viruses or other illicit and destructive computer programs such as Trojan horses or worms into the network environment.

Another network communication security issue that should be addressed when transmitting sensitive information is the unavoidable problem of an authorized party examining communications in transit whenever a public or unsecure network is used. Data to be sent from one location to another is divided or broken down into "packets." The packets are individually routed or sent over the network and then reassembled at the appropriate destination. As part of the communication transmission process, certain information regarding the origin, destination, and contents of a transmission is packaged and sent along with the actual data packets being transmitted. By examining or "sniffing" the packet and utilizing the packet information, unscrupulous intruders can mimic legitimate network communication traffic and gain access to otherwise secure networks.

One popular solution used to provide computer network security for communication over unsecure networks is known as a "firewall." A firewall is a separate computer system with a dedicated microprocessor that can be used to provide certain types of security. The firewall computer system is usually placed into the computer network so that it is logically located between the protected system and the unsecure network. The firewall can be configured to provide various types of network communication security for the protected system. The use of firewalls is well known in the art and various types of firewalls can be implemented in different ways.

The most common and simplest type of firewall is one that simply does packet filtering. This type of firewall can block undesirable in-coming traffic while allowing outgoing traffic to continue to be processed. Packet filtering firewalls are relatively inexpensive since most network routers currently provide the ability to specify various rules for filtering in-coming packets. Unfortunately, a packet-filtering firewall system suffers from a number of significant drawbacks. These drawbacks include little or no activity logging, exposure of Internet addresses and other network information to public access, and the complex filtering scenarios typically required to handle communications with multiple computer systems.

Another common firewall system is called a dual-homed gateway firewall. A dual-homed gateway consists of a system with two network interfaces that requires that all network communication traffic between the secure network and the unsecure network must pass through the gateway. Normal packet routing and forwarding features are disabled, so an alternative communication mechanism such as proxies or servers must be used. Depending on the availability of proxies and servers, this type of firewall can be very restrictive. In addition, because all network communication traffic must pass through the gateway, overall throughput and system performance may suffer.

While useful, the addition of a firewall computer system generally introduces a significant level of complexity into a network environment. No matter which type of firewall system is utilized, security concerns common to firewall systems in general remain. For example, the firewall computer system must be secured in a protected location where physical access can be controlled. Otherwise, the protected system may be compromised by a direct physical attack on the firewall computer system. Firewall systems must be initially set-up or configured, and occasionally must be reconfigured as the network environment and the nature of the protected systems changes and develops. The initial set-up will typically include installing the operating system, installing the communication software, and customizing the operating system for the specific network environment. The reconfiguration process, whereby the system parameters are changed or otherwise updated, is typically time-consuming and may introduce inadvertent security errors.

In addition, for the sake of convenience, it is often desirable to monitor and control the activity of the firewall system from a remote location. However, remote access capability opens the firewall computer system up to the possibility of tampering or unauthorized access by a system intruder such as a hacker or cracker. After breaking into private computer networks, crackers have been able to erase files or disks, cancel programs, retrieve sensitive information and even introduce computer viruses. Skilled intruders can also disable monitoring and logging facilities so that their presence is undetected. Intruders will then reconfigure the firewall system so as to allow undesirable network communication traffic through the firewall, thereby compromising the security of the protected system.

Without improved methods for providing security and protection for networked computer resources, computer systems will remain less secure and open to potentially devastating attacks, even if protected by a standard firewall system. As businesses increasingly utilize public networks such as the Internet to provide site-to-site connectivity, a common need exists to increase the level of protection available with firewalls, thereby more effectively protecting the networked computer resources. Without a mechanism that is capable of providing increased levels of security between computer systems and resources currently available via networks, network communications and transactions between network users and remote locations will be subject to unnecessary compromise.

DISCLOSURE OF INVENTION

According to the present invention, an embedded security processor is used in conjunction with a main processor to provide security for a computer system that is accessible via a computer network. In a preferred embodiment of the present invention, an expansion board is provided that has an embedded security processor dedicated to network communications security tasks. The embedded security processor is controlled by the main processor and intercepts all communications from external untrusted or unverified network systems (i.e., unsecure networks) and verifies that the attempted communication is permissible before allowing the external network communication traffic to access the main processor via the system bus, or other networked computer resources accessible via a secure network.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The Overview Section immediately below is intended to provide an introductory explanation of various types of firewalls for individuals who need additional background in this area. Those who are skilled in the art may wish to skip this section and begin with the Detailed Description section instead.

OVERVIEW

Host-based firewalls, also known as dual-homed firewalls, provide a level of security for networked computer resources by interposing a separate computer system between the private, secure network and the Internet or other public, unsecure network. In some dual-homed firewalls, Internet Protocol (IP) packet forwarding is disabled, preventing the firewall from routing IP packets automatically according to the addresses provided. Such dual-homed firewalls also provide a special set of Transmission Control Protocol (TCP) applications to act as proxy agents to communicate with users outside of the secure network. In this way, the firewall maintains control over the communications which enter and exit the secure network. A disadvantage of host-based firewalls is the continual need to increase the size of the firewall system to support increased traffic between the secure network and the unsecure network. Another disadvantage of host-based firewalls is that crackers need only to overcome the security defenses of a single computer system in order to gain access to the secure network.

Another type firewall system, known as a bastion host, and also known as an application level firewall, overcomes the capacity disadvantage of host-based firewall systems by providing a subnetwork of hosts to control traffic in and out of the secure network. The subnetwork can be expanded by adding hosts as capacity need increases. With bastion hosts, the unsecure network is permitted to access only up to an exterior router R2, while the secure network is permitted to access only up to an interior router R1. Between the routers, a group of proxy hosts are provided that control access to various applications available for communication with the secure and unsecure networks. A disadvantage of this system is that code must be specially written to specify each application to be allowed through the subnetwork, making changes in applications availability costly and time-consuming. Another disadvantage is the cost and complexity of maintaining a separate subnet and multiple computer systems as hosts for the system.

Figure 2:
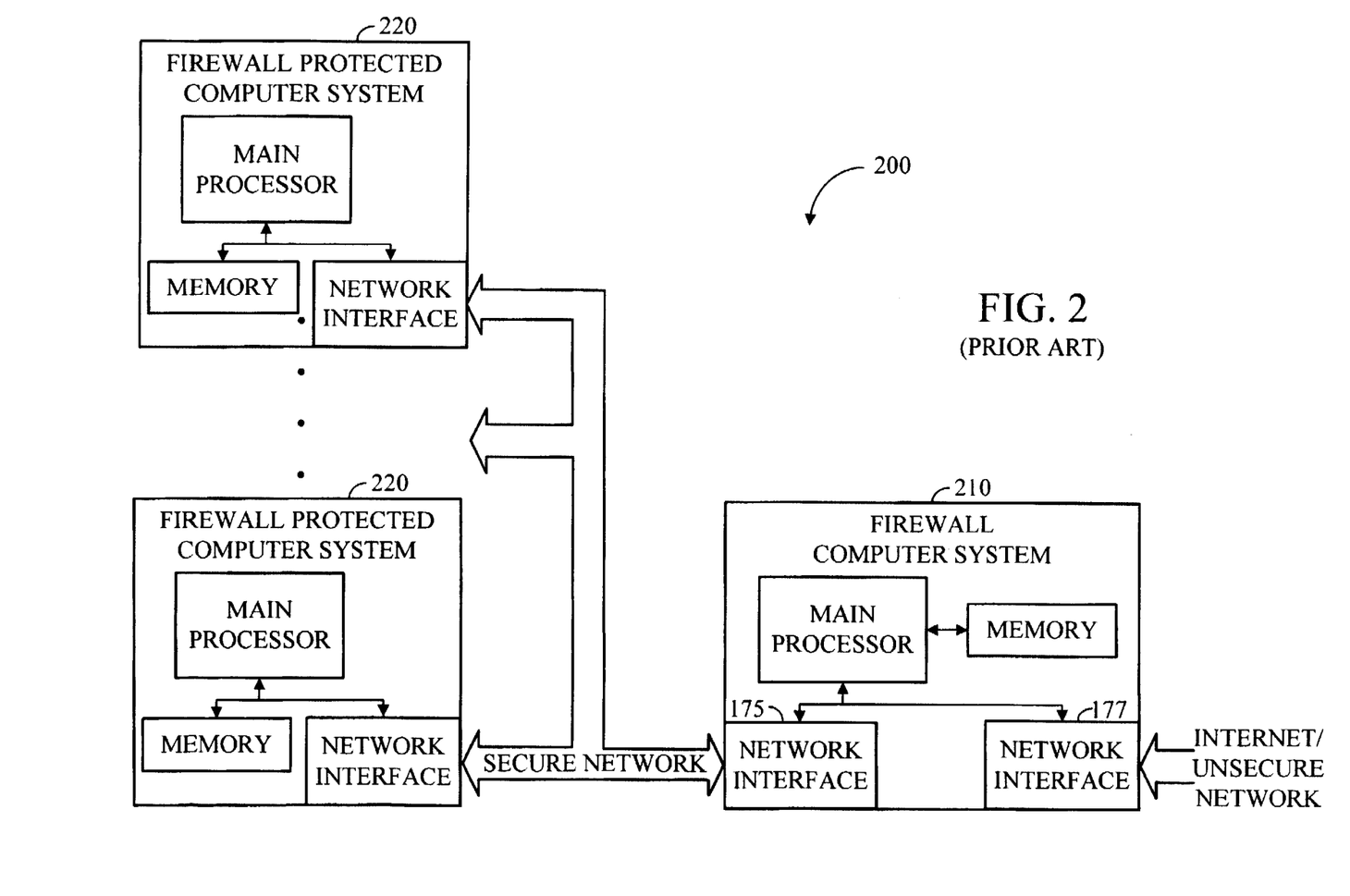
FIG. 2 is a block diagram of a known firewall computer system in a network environment.

Referring now to FIG. 2, a typical firewall-protected system 200 includes: a firewall computer system 210 and a series of firewall protected computers 220. Firewall computer system 210 includes network interfaces 175 and 177. Firewall protected computer systems 220 are "shielded" from the Internet or other unsecure network by firewall computer system 210. Any of the security methods or techniques used above may be employed in firewall computer system 210. Network interface 175 is used to connect firewall computer system to the secure network that allows communication between firewall computer system 210 and firewall protected computer systems 220. The unsecure network is connected using network interface 177 and all external network communication with firewall protected computer systems 220 must pass through firewall 210.

DETAILED DESCRIPTION

According to the present invention, an embedded security processor is used to provide security for a computer system that is accessible via a computer network. In a preferred embodiment of the present invention, an expansion board is coupled to the system bus with a secondary embedded security processor dedicated to network communications security tasks. The secondary embedded security processor is controlled by the main processor and intercepts all communications from external untrusted or unverified network systems and verifies that the attempted communication is permissible before allowing the external network communication traffic to have access to the main processor or other networked computer resources.

Figure 1:
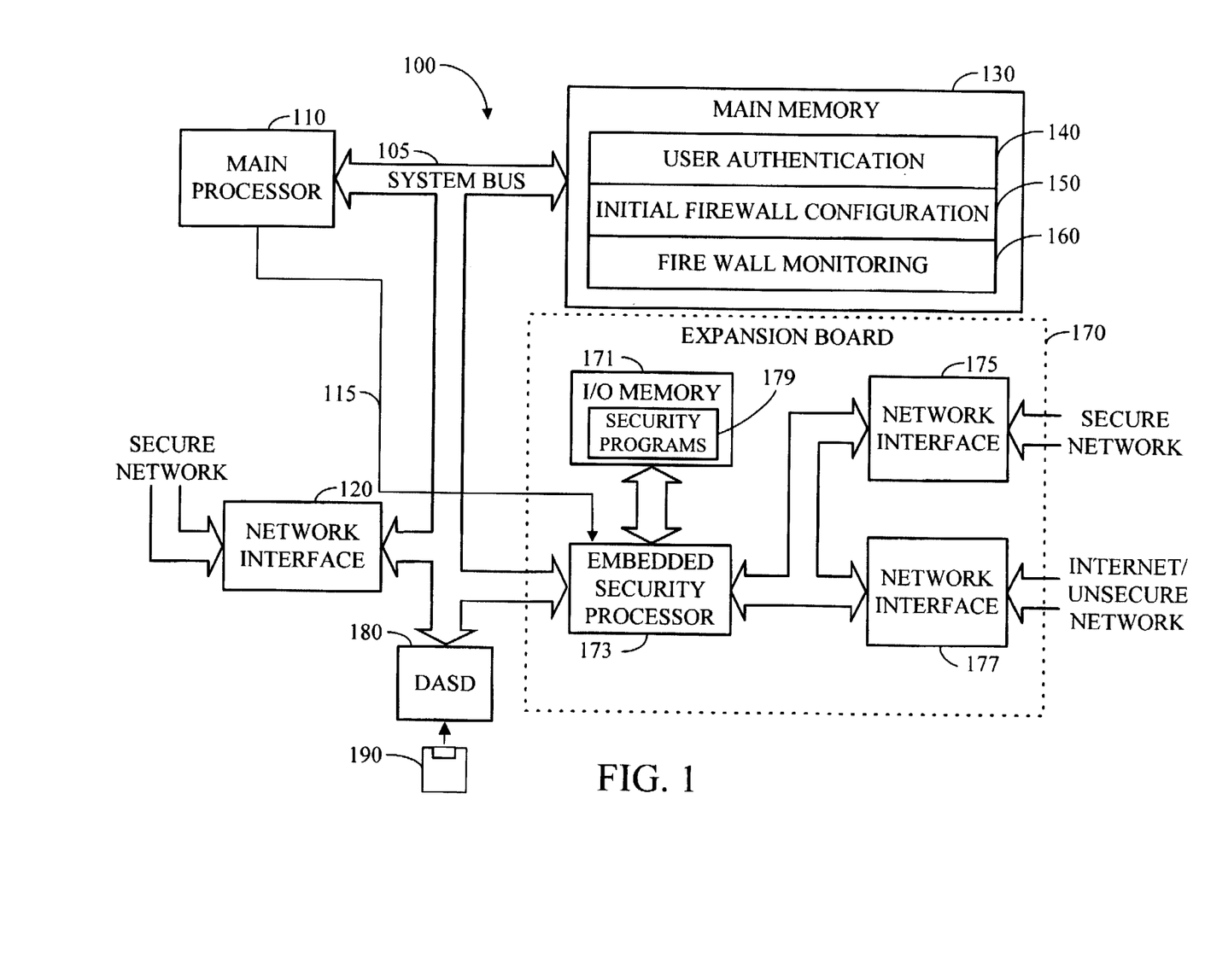
FIG. 1 is a block diagram of a computer system in accordance with a preferred embodiment of the present invention.

Referring now to FIG. 1, a computer system 100 with an embedded security processor in accordance with a preferred embodiment of the present invention includes: a system bus 105; a control signal 115; a main processor 110; an optional network interface 120; a main memory 130; a user authentication program 140; an initial firewall configuration 150; a firewall monitoring program 160; an expansion board 170; and a Direct Access Storage Drive (DASD) 180. Expansion board 170 includes: a secondary or Input/Output (I/O) memory 171; a secondary or embedded security processor 173; a first network interface 175; and a second network interface 177.

System bus 105 serves to transmit programs, data, status and other forms of information or signals between the various components of system 100. The preferred embodiment for system bus 105 uses a tightly-coupled system bus between main processor 110 and embedded security processor 173. However, in alternative embodiments, system bus 105 may be any suitable physical or logical means of connecting computer systems and components known to those skilled in the art. This includes, but is not limited to, direct hard-wired connections, Internet connections, Intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

Control signal 115 is a signal or a group of signals transmitted from main processor 110 to embedded security processor 173. While control signal 115 is shown as a separate line in FIG. 1, control signal 115 may also be incorporated in to system bus 105 and may be a part of system bus 105. Main processor 110 controls the operation of embedded security processor 173 using control signal 115. For example, control signal 115 is capable of disabling embedded security processor 173 and can shut off the electrical power supply that provides power to embedded security processor 173.

Network interfaces 120, 175, and 177 may be any type of interface known to those skilled in the art for providing connections to computer systems and networks. For example, in the case of a Local Area Network (LAN), the network interfaces could be token-ring adapters, Ethernet adapters, etc. In the case of a Wide Area Network (WAN), the network interfaces could be ISDN adapters, serial modems, cable modems, etc.

Main processor 110 controls the communication between the various elements of system 100 by monitoring system bus 105. Main processor 110 may permit selected elements to communicate with other elements directly or may require them to communicate only with main processor 110 with appropriate communication traffic being forwarded by main processor 110. Main processor 110 may also limit the scope of interaction between various components. For example, embedded security processor 173 may perform read-only operations on selected portions of DASD 180. In a preferred embodiment, embedded security processor 173 is restricted to communicating only with main processor 110. This effectively isolates embedded security processor 173 from the other protected or secure components of system 100. Main processor 110 will forward the communication to the appropriate system component or location after verifying that the request or communication is valid and proper.

Main processor 110 may be implemented as a single Central Processing Unit (CPU) or as a combination of multiple specialty microprocessors which work in concert to perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within main memory 130 and acting in response to those programs or other activities that may occur in system 100.

Main memory 130 may be any type of memory device or component known to those skilled in the art. This would include Dynamic Random Access Memory (DRAM), Static RAM (SRAM), flash memory, cache memory, etc. While not explicitly shown in FIG. 1, main memory 130 may be a single type of memory component or may be composed of many different types of memory components.

As shown in FIG. 1, DASD 180 may be a floppy disk drive which is capable of reading and writing programs or data on floppy disk 190. DASD 180 may also be any other type of DASD known to those skilled in the art. This would include CD-ROM drives, hard disk drives, optical drives, etc. Floppy disk 190 represents a typical 3.5 inch magnetic media disk known to those skilled in the art. In a preferred embodiment of the present invention, DASD 180 is configured so that portions of the storage device that contain the security programs that are executed by embedded security processor 173 are protected, and cannot be updated by embedded security processor 173. In a preferred embodiment, all attempts and requests for updates or changes to any security program or feature must be routed through main processor 110 as described above. After receiving and approving the request, main processor 110 may retrieve the requested data and control the transfer of the requested data or, alternatively, main processor 110 may allow embedded security processor 173 to access the requested data directly by using an authorization signal transmitted to embedded security processor 173.

Expansion board 170 provides the security features for system 100. Expansion board 170 includes: embedded security processor 173; I/O memory 171; and network interfaces 175 and 177. One preferred embodiment of expansion board 170 is an after-market hardware/software solution designed to be placed into an existing computer system to provide enhanced firewall capabilities for networked computer resources. Another preferred embodiment of the present invention may be incorporated as an integral component of system 100 at the time system 100 is initially manufactured.

Embedded security processor 173 may be implemented as a single Central Processing Unit (CPU) or as a combination of multiple specialized microprocessors which work in concert to perform computation and control functions of expansion board 170. Embedded security processor 173 may comprise a single integrated circuit, such as a microprocessor, or may comprise any suitable number of integrated circuit devices and/or circuit boards working in cooperation to accomplish the functions of a central processing unit. Embedded security processor 173 is capable of suitably executing the programs contained within I/O memory 171 and acting in response to those programs or other activities that may occur in expansion board 170.

In some preferred embodiments of the present invention, it may be desirable to include multiple expansion boards 170. These expansion boards may be connected to multiple unsecure networks or to the same unsecure network. Multiple expansion boards 170 can be used to increase system throughput and availability/reliability. The expansion boards may be placed inside a single computer in system 100 or, alternatively, in multiple computer systems that are attached to the same secure network.

I/O memory 171 may be any type of memory device or component known to those skilled in the art. This would include Dynamic Random Access Memory (DRAM), Static RAM (SRAM), flash memory, cache memory, etc. While not explicitly shown in FIG. 1, I/O memory 171 may be a single type of memory component or may be composed of many different types of memory components. I/O memory 171 serves as a storage location for utilization by embedded security processor 173.

Network interfaces 175 and 177 are hardware components specifically adapted to provide an interface or connection to their respective networks. The exact configuration of network interfaces 175 and 177 is a design choice that will depend on the type of network connection desired and the availability of various types of connections for a given network hardware/software protocol. Network interface 175 may be used by other computer systems on the internal secure network to access information and communicate via the Internet or other unsecure network. The communications traffic can be processed by embedded security processor 173 while the operation of the embedded security processor 173 is monitored by main processor 110. It is important to note that embedded security processor 173 protects not only the computer system in which it resides, but embedded security processor 173 can also perform firewall and related security functions for other computers or networked computer resources in system 100 that are attached to the internal secure network via system bus 105.

In order to provide firewall security protection against unwanted traffic over an unsecure network such as the Internet, network interface 177 located on expansion board 170 can be connected to the unsecure network. Embedded security processor 173 is under the control of main processor 110. Main processor 110 controls embedded security processor 173 via control signal 115. Main processor 110 will use control signal 115 to start, stop, and otherwise control embedded security processor 173 as determined by the security needs of system 100. Since network interface 177 is attached to the unsecure communications network, all communication traffic between main processor 110 and the unsecure network must pass through embedded security processor 173. Embedded security processor 173 blocks all unwanted communications traffic from reaching main processor 110 or system bus 105 while allowing desired traffic to be passed on to main processor 110 via system bus 105 or some other computer systems via network interface 175. Embedded security processor 173 therefore isolates system bus 105 from the network interfaces 175 and 177, thereby providing another layer of security that does not exist in the prior art. In addition, embedded security processor 173 can handle incoming communication packets according to the security processes as directed by main processor 110.

The security programs and initial firewall configuration are stored in a protected portion of DASD 180 that embedded security processor 173 may not access directly. When system 100 starts, main processor 110 executes the initial firewall configuration program 150 in its main memory, which directs main processor 110 to retrieve the initial firewall configuration and one or more security programs 179 from DASD 180, and transfers this information to embedded security processor 173. Because main processor 110 delivers the required initial firewall configuration data and security programs to embedded security processor 173, the embedded security processor 173 has no idea that this information is stored in DASD 180. Some examples of typical security programs that might reside in I/O memory 171 and be executed by embedded security processor include: packet filtering programs, data encryption/decryption programs, proxy serving routines for TCP/IP protocols such as Telnet, HyperText Transfer Protocol (HTTP), and File Transfer Protocol (FTP). This list is not all-inclusive and many other types of security features implemented in existing firewall environments may also be implemented by other types of security programs used in conjunction with a preferred embodiment of the present invention. Embedded security processor 173 can examine both incoming and outgoing packets being transmitted by the network. Embedded security processor 173 will determine if the packets are correct and authorized on system 100 and verify conformity with network protocols. Examination may be performed on a packet-by-packet basis or may be examined in combination with other packets, as desired. Any invalid, unauthorized, or undesired packets may be discarded by embedded security processor 173. For example, an unauthorized request to access the Playboy home page on the World Wide Web may be rejected and discarded by embedded security processor 173. Packets that are not discarded will be routed to the appropriate destination.

Additionally, embedded security processor 173 may transform data packets, if necessary. This will typically involve an encryption/decryption process to maintain the confidentiality of certain packets. As mentioned above, certain information contained in packet headers and descriptors may reveal information about the network and about system 100 that can be utilized by intruders to gain unauthorized access to system 100. To prevent this, embedded security processor 173 may translate or transpose addresses as they come and go so that systems on the unsecure network cannot learn the real addresses of the protected resources.

As shown in FIG. 1, secure network communication traffic can be routed to main processor 110 via system bus 105 by using network interface 120, essentially bypassing expansion board 170. This optional feature allows network connectivity for system 100 without the additional overhead of using the firewall capabilities of expansion board 170 unless necessary. Network interface 120 is a hardware component specifically adapted to provide an interface or connection to a given network. The exact configuration of network interface 120 is a design choice that will depend on the type of network connection desired and the availability of various types of connections for a given network hardware/software protocol. If optional network interface 120 is not provided, communication between main processor 110 and the secure network may take place by using network interface 175.

System bus 105 provides a communication link between main processor 110 and embedded security processor 173. Main processor 110 also uses system bus 105 to communicate with embedded security processor 173 and to control the security features of expansion board 170. Main processor 110 controls the security features of expansion board 170 by executing the programs stored in main memory 130. For example, firewall monitoring program 160 is started immediately after embedded security processor 173 is started and remains active until embedded security processor 173 is stopped by main processor 110. Firewall monitoring program 160 establishes a connection with the embedded security processor 173 and receives information from embedded security processor 173 related to the communications packets that it is processing. If any number of predetermined error conditions are detected by the firewall monitoring program 160, main processor 110 will disable embedded security processor 173 via control signal 115. One error condition that triggers the disabling of embedded security processor 173 is if the connection between firewall monitoring program 160 and embedded security processor 173 is lost. Another error condition that triggers the disabling of embedded security processor 173 is if the data received by firewall monitoring program 160 from embedded security processor 173 indicates that an intrusion or otherwise undesirable activity is being attempted. By disabling embedded security processor 173, any threat or error condition that occurs via first network interface 175 or second network interface 177 is effectively isolated from system bus 105 (and hence, from the secure system resources of computer system 100).

The security tasks performed by embedded security processor 173 and expansion board 170 may vary and may be adapted according to the specific network environment and security needs associated with system 100. Examples of typical security tasks that would be performed by expansion board 170 to protect system 100 from the Internet or other unsecure network include packet filtering, data encryption, proxy serving for TCP/IP protocols such as Telnet, HyperText Transfer Protocol (HTTP), and File Transfer Protocol (FTP). In addition, embedded security processor 173 keeps a log of all activities performed. The activity log information can be sent immediately or periodically to main processor 110, to DASD 180, or to both. If the activity log information is to be sent by embedded security processor 173 to DASD 180 for storage, then main processor 110 must have previously arranged for a writeable section of storage on DASD 180 with access authorization provided for embedded security processor 173.

In a preferred embodiment of the present invention, embedded security processor 173 sends the log information to DASD 180 for storage on a writeable portion of DASD 180. On a daily basis, main processor 110 reads the activity log information from DASD 180 and stores the activity log information in a protected section of DASD 180 that cannot be accessed by embedded security processor 173. Main processor 110 controls the activity log procedures and determines what information will be logged, the frequency and location of storage, etc. In addition, certain activities can be used to flag immediate notification to main processor 110, regardless of the normal, prearranged logging procedures. For example, if a certain activity, such as unauthorized access, is attempted n times in m minutes, a warning notification may be triggered and sent immediately to main processor 110.

The operating system and security programs for embedded security processor 173 are obtained from a portion of DASD 180 that is fully accessible by main processor 110 but is read-only accessible to embedded security processor 173. The firewall configuration data is similarly stored in a protected area of DASD 180. This means that the security programs and firewall configuration can only be changed or updated by main processor 110. Embedded security processor 173 is initialized with the desired security instructions and firewall configuration at system startup. Since the data is presented to embedded security processor 173 as read-only, neither embedded security processor 173 nor entities outside the secure network of system 100 can alter the security programs or firewall configuration.

User authentication information 140, initial firewall configuration 150, and firewall monitoring program 160 are all stored in main memory 130. User authentication program 140, initial firewall configuration 150, and firewall monitoring program 160 are all examples of firewall control programs and are executed by main processor 110 to control the activity of embedded security processor 173.

User authentication information 140 can be used to verify which users have access to controlled areas of system 100. For example, user authentication information 140 can restrict or allow access to certain portions or areas of system 100 based on pre-determined user profiles and information access requirements. In addition, authentication information 140 can be used by embedded security processor 173 when examining network communication packets. Embedded security processor 173 can extract authentication information (e.g. userid/password, X.509 certificate, etc.) from a packet and present the information to main processor 110 for verification. Main processor 110 can be configured to return a boolean (yes/no) response as to whether or not the packet or packets should be authorized transmission within the secure area of system 100. This feature can be used to control access for which users on the secure network can access the unsecure network (e.g., Internet).

Figure 3:
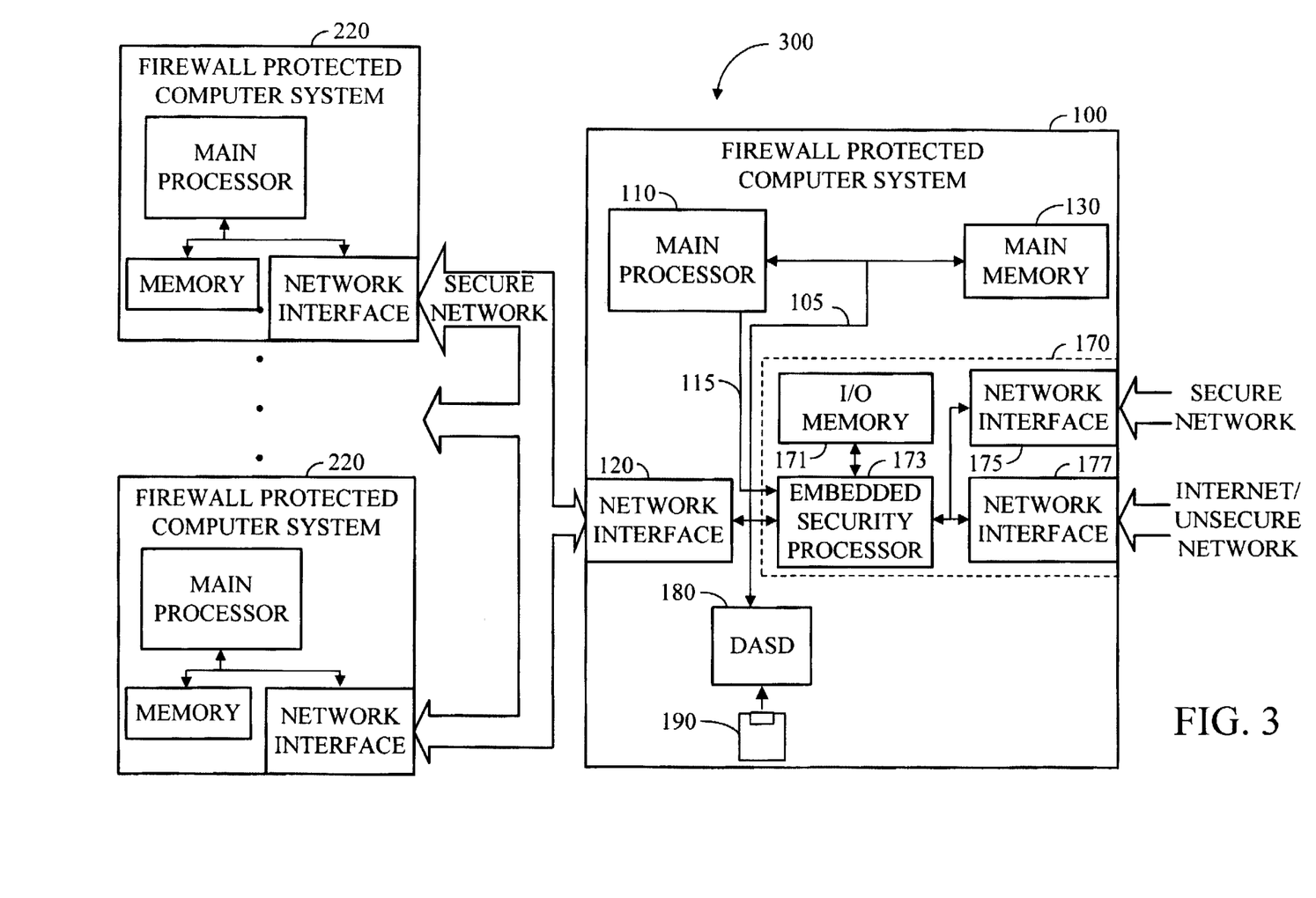
FIG. 3 is a block diagram showing how the computer system of FIG. 1 may be used for firewall protection for a secure network.

Referring now to FIG. 3, a system 300 according to a preferred embodiment of the present invention includes: a firewall protected computer system 100 and multiple firewall protected computer systems 220. The components of the computer systems shown in FIG. 3 are as described above in conjunction with FIGS. 1 and 2. It is important to note that the secure network connected to network interface 175 and the secure network connected to network interface 120 is the same network. In this configuration, computer system 100 provides the firewall between the secure and the unsecure networks. In this manner, firewall protected computer systems 220 are isolated and kept secure from unauthorized accesses to and from the unsecure network.

The use of an embedded security processor according to a preferred embodiment of the present invention provides several significant advantages over conventional firewall systems. Specifically, the present invention provides a mechanism for application programs and security programs to be run on separate processors. This eliminates the possibility of one program interfering with the functional operation of the other. In addition, since the software and configuration information used by embedded security processor 173 appears to embedded security processor 173 as a read-only portion of DASD 180, overall system security is enhanced. This means that unauthorized users who attempt to gain access through embedded security processor 173 will not be able to change the security configuration of system 100. This feature also eliminates the possibility of infection by a virus or undesired modification of the configuration or other security programs that monitor network communications and provide security features for system 100.

Since main processor 110 and embedded security processor 173 are tightly coupled and communicate directly over internal system bus 105, which is not directly connected to the external or unsecure network, internal system bus 105 is not subject to sniffing programs that may be used to monitor network communication traffic on Local Area Networks (LANs). Another advantage offered by the present invention is that main processor 110 can automatically disable embedded security processor 173 whenever tampering is detected, regardless of the conditions that are affecting the secondary processor. With existing firewall systems, the only way to remove the firewall from the network is to physically disconnect the firewall system from the network or to power down the firewall system.

Finally, a preferred embodiment of the present invention will generally be less expensive than a traditional firewall system because the entire embedded security processor can be manufactured on a single expansion board which can be inserted into industry standard hardware systems with minimal customization requirements. There is no requirement for a separate keyboard, mouse, or display unit. While this feature will reduce costs, it also provides additional security for the firewall because there is no way to access, update or alter the security programs stored in main memory 130 except through main processor 110.

While the invention has been particularly shown and described with reference to preferred embodiments thereof, it will be understood by those skilled in the art that various changes in form and details may be made therein without departing from the spirit and scope of the invention.

What is claimed is:

1. An apparatus comprising:

a processor;

a first network interface for connecting a system to a first network;

a second network interface for connecting the system to a second network; and an embedded security processor coupled to the processor, to the first network interface, and to the second network interface, the embedded security processor ensuring that communications between the first and second networks are secure; and at least one control signal coupled to the processor and to the embedded security processor, the processor controlling the operation of the embedded security processor via the at least one control signal and disabling the embedded security processor via the at least one control signal when the processor detects at least one predetermined error condition.

2. The apparatus of claim 1 wherein the at least one predetermined error condition comprises an activity by the embedded security processor designated as an undesired activity by the processor.

3. The apparatus of claim 1 wherein the at least one predetermined error condition comprises an unauthorized attempt by one of the first and second networks to access the other network.

4. The apparatus of claim 1 wherein the at least one control signal comprises at least one signal on a system bus coupled to the processor and to the embedded security processor.

5. The apparatus of claim 1 wherein the at least one control signal comprises at least one signal on a control bus coupled to the processor and to the embedded security processor.

6. The apparatus of claim 1 wherein one of the first and second networks is a secure network and the other is an unsecure network.

7. The apparatus of claim 1 wherein both the first and second networks are secure networks.

8. The apparatus of claim 1 further comprising:

a memory coupled to the processor, the memory containing at least one firewall control program, the processor executing the at least one firewall control program to control access between the first and second networks.

9. The apparatus of claim 8 wherein the firewall control program comprises a user authentication program.

10. The apparatus of claim 8 wherein the firewall control program comprises an initial firewall configuration program.

11. The apparatus of claim 10 wherein the initial firewall configuration program determines access allowed by the embedded security processor to the processor from the first and second networks.

12. The apparatus of claim 8 wherein the firewall control program comprises a firewall monitoring program.

13. The apparatus of claim 1 wherein the embedded security processor and the first network interface and the second network interface are located on an expansion board coupled to a system bus that is coupled to the processor.

14. A method for providing firewall protection between a first network and a second network, the method comprising the steps of:

initiating a connection on one of the first and second networks, the first and second networks being coupled to an apparatus, the apparatus including an embedded security processor coupled to the first network and to the second network, the embedded security processor coupled to a processor; and using the processor to disable the embedded security processor when the processor detects an unauthorized attempt by one of the first and second network to access the other network.

15. The method of claim 14 further comprising the steps of:

providing a memory coupled to the processor, the memory containing at least one firewall control program; and the processor executing the at least one firewall control program to control access between the first and second networks.

16. The method of claim 15 wherein the at least one firewall control program is a user authentication program.

17. The method of claim 15 wherein the at least one firewall control program is an initial firewall configuration program.

18. The method of claim 15 wherein the at least one firewall control program is a firewall monitoring program.

19. The method of claim 15 further comprising the step of:

the processor disabling the embedded security processor if the at least one firewall control program detects an activity by the embedded security processor designated as an undesired activity by the at least one firewall control program.

20. The method of claim 15 further comprising the step of:

the processor disabling the embedded security processor if the at least one firewall control program detects an unauthorized attempt by one of the first and second networks to access the other network.

21. The method of claim 14 further comprising the steps of:

the embedded security processor requesting firewall configuration data from the processor; and the processor reading the firewall configuration data from a protected memory and passing the firewall configuration data to the embedded security processor.

22. The method of claim 14 further comprising the steps of:

the embedded security processor requesting at least one security program from the processor; and the processor reading the at least one security program from a protected memory and passing the at least one security program to the embedded security processor.

23. A method for providing firewall protection between a first network and a second network, the method comprising the steps of:

initiating a connection on one of the first and second networks, the first and second networks being coupled to an apparatus, the apparatus including an embedded security processor coupled to the first network and to the second network, the embedded security processor coupled to a processor; and the embedded security processor ensuring that communications between the first network and the second network are secure providing at least one control signal to the processor and to the embedded security processor, the processor controlling the operation of the embedded security processor via the at least one control signal and disabling the embedded security processor via the at least one control signal when the processor detects at least one security-relevant condition.

24. The method of claim 23 wherein one of the first and second networks is a secure network and the other is an unsecure network.

25. The method of claim 23 wherein both the first and second networks are secure networks.

26. The method of claim 23 wherein the at least one security-relevant condition comprises an activity by the embedded security processor designated as an undesired activity by the processor.

27. The method of claim 26 further comprising the steps of:

the embedded security processor requesting firewall configuration data from the processor; and the processor reading the firewall configuration data from a protected memory and passing the firewall configuration data to the embedded security processor.

28. The method of claim 26 further comprising the steps of:

the embedded security processor requesting at least one security program from the processor; and the processor reading the at least one security program from a protected memory and passing the at least one security program to the embedded security processor.

29. The method of claim 26 further comprising the steps of:

the processor to creating an activity log for the activities of the embedded security processor; and storing the activity log on a direct access storage device.

30. The method of claim 23 wherein the at least one security-relevant condition comprises an unauthorized attempt by one of the first and second network interfaces to access the other network interface.

31. The method of claim 23 further comprising the steps of:

providing a memory coupled to the processor, the memory containing at least one firewall control program; and the processor executing the at least one firewall control program to control access between the first and second networks.

32. The method of claim 31 wherein the at least one firewall control program is a user authentication program.

33. The method of claim 31 wherein the at least one firewall control program is an initial firewall configuration program.

34. The method of claim 32 wherein the at least one firewall control program is a firewall monitoring program.

35. The method of claim 32 further comprising the step of:

the processor disabling the embedded security processor if the at least one firewall control program detects an activity by the embedded security processor designated as an undesired activity by the at least one firewall control program.

36. The method of claim 32 further comprising the step of:

the processor disabling the embedded security processor if the at least one firewall control program detects an unauthorized attempt by one of the first and second networks to access the other network.

37. The method of claim 23 further comprising the step of:

transferring information from a direct access storage device to the embedded security processor after receiving an authorization signal from the processor.

38. The method of claim 23 further comprising the step of:

transferring data to the embedded processor only after the processor has approved the transfer of information.

* * * * *

UNITED STATES PATENT AND TRADEMARK OFFICE
CERTIFICATE OF CORRECTION

PATENT NO. : 5,896,499
DATED : Apr. 20, 1999
INVENTOR(S) : Mark Ambrose McKelvey It is certified that error appears in the above-identified patent and that said Letters Patent is hereby corrected as shown below:

Claim 23, Col. 13, Line 53 after "signal", insert --coupled--.

Signed and Sealed this

Twelfth Day of October, 1999

Attest:

Q. TODD DICKINSON

*Attesting Officer*                *Acting Commissioner of Patents and Trademarks*